2 Sheets--Sheet 2.
J. TROLL.
Tellurians.
No. 167,138. Patented Aug. 24, 1875.
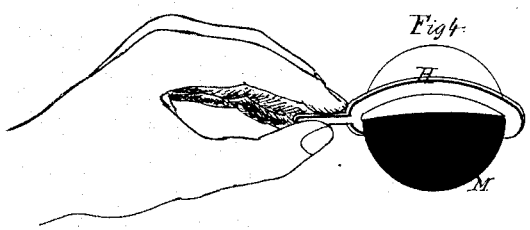
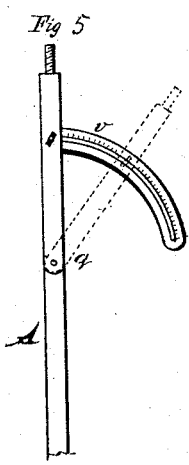
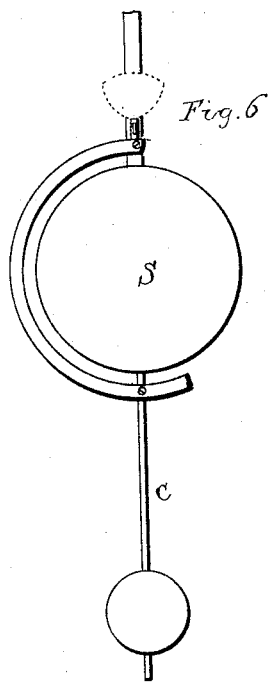
WITNESSES
J. Wm Garner
C. W. Chapman
INVENTOR
Joseph Troll
per F. A. Lehmann
Atty

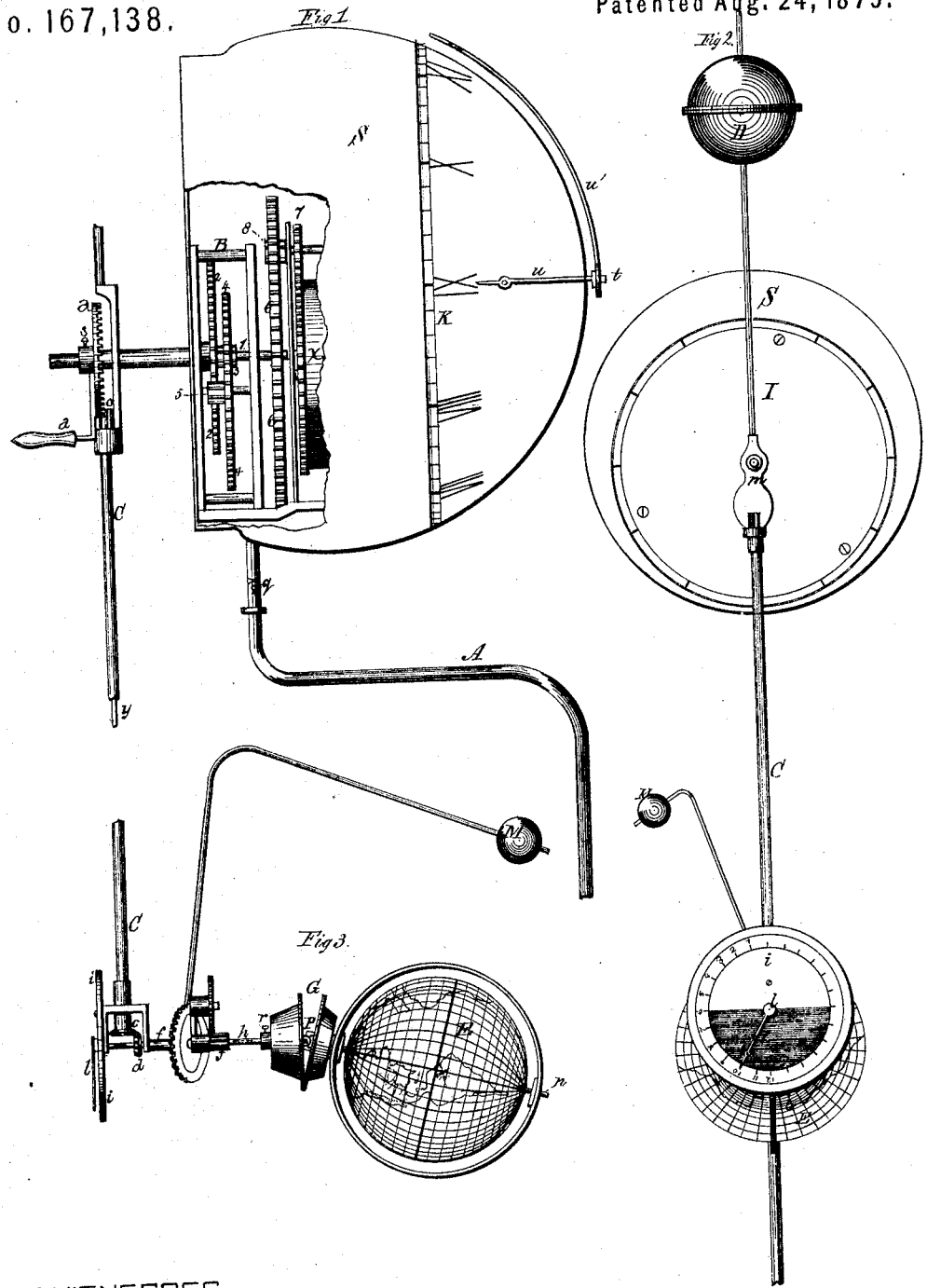

UNITED STATES PATENT OFFICE.

JOSEPH TROLL, OF BELLEVILLE, ILLINOIS.

IMPROVEMENT IN TELLURIANS.

Specification forming part of Letters Patent No. 167,138, dated August 24, 1875; application filed May 10, 1875.

*To all whom it may concern:*

Be it known that I, JOSEPH TROLL, of Belleville, in the county of St. Clair and State of Illinois, have invented certain new and useful Improvements in Tellurians; and I do hereby declare the following to be a full, clear, and exact description of the invention, such as will enable others skilled in the art to which it pertains to make and use it, reference being had to the accompanying drawings, which form part of this specification.

My invention relates to an improvement in tellurians; and it consists in the combination and arrangement of parts to illustrate the motion of the earth and moon, and their relative positions to each other and to the sun, and also the time of their revolution, hereinafter described.

The accompanying drawing represents my invention.

A represents a standard, supporting at its upper end a hollow globe, S, representing the sun, which forms the center of the solar system. Within the globe S, and supported by a suitable frame, B, is placed, upon the shaft 1, the wheel 2, and to a sleeve upon the shaft, which shaft is turned by the crank $a$, is the pinion 3, which pinion has a motion independent of the wheel 2. The pinion 3, which turns with the shaft, gears with the wheel 4, upon the axis of which is the pinion 5, that gears with the wheel 2, communicating a slow motion, which represents the earth being carried in its orbit around the sun. Upon the inner end of the shaft 1 is the wheel 6, which gears with the wheel 8, attached to the clock-work, and is kept in motion by being geared with the spring-barrel in the clock. Hence, if the clock be removed, the crank will supply motion to the wheels, which otherwise is done by the clock in accordance with the time required by nature to perform the revolution of the earth around the sun. Motion is communicated from the globe S, by a pinion, 3, on its axis, to the rod C through the crank-wheel $a$ and pinion $o$ at the inner end of the rod C. At the other end of the rod C is also a pinion, $c$, which turns the beveled wheel $d$ upon the sleeve $f$, through which the shaft or axis $h$ passes, which shaft carries upon one end a dial, $i$, upon which a hand, $l$, indicates twenty-four hours. Upon the inner end of the sleeve $f$ are placed the wheels and pinion necessary to move the sphere representing the moon around the earth, as described in the patent of the inventor dated August 1, 1871, and are connected with a pinion, $j$, upon the axis $h$. The horizontal axis $h$ here terminates, but is connected by a universal joint, $p$, to a rod, $n$, which rod, passing through the center, forms its axis. At the connection of the rod $h$ and $n$ is a bell-cap device, G, the one-half upon the end of the rod $h$ being adjustable by means of a set-screw, $r$, to determine the degree of inclination of the earth to the ecliptic between zero and ninety degrees, which is of importance in order to explain the cause and length of the different seasons, and the decrease and increase in the length of days on our planet. By turning the crank $a$ the daily and yearly revolutions of the earth and the daily and yearly revolutions of the moon are shown. If it is, however, desired to show the motion and its velocity exactly in regard to time as it is in nature, the clock-work placed in the sun S is moved back so that it will come in gear with the train of wheels 1 2 3 4 5, when the wheel $a$ will be made to move the earth around the sun, the earth to turn on its own axis, and the moon to revolve around the earth. The revolutions of the earth upon its own axis once in twenty-four hours are indicated by the hand $l$ upon the dial $i$. Upon the sun's body a dial, I, is attached, upon which the signs of the zodiac, the months, and days are represented, and indicated by a pin in the rod C. The axis of the main wheel within the body representing the sun is eccentric to the same, as shown in Fig. 1, to illustrate the perihelion and aphelion. The different phases of the moon may be illustrated by the use of a small ring, H. (Shown in Fig. 4.) The crank-wheel $a$ may be thrown out of gear by turning the set-screw $s$, and if then the crank-wheel be turned by hand the earth will perform its yearly revolution only; but if this crank-wheel be entirely removed, and the pinion turned by hand, the earth rotates and the moon revolves—this to show that if it were so in nature there would be no change of seasons, nor would the days vary in length. Any one will readily see how, by means of the set-screw $r$, the position of the earth may be changed, so as to illustrate that were it not for the inclination of the earth's axis there would be no change of seasons, &c. All the phenomena consequent upon the various positions of the earth relatively to the center of the solar system can be readily and clearly demonstrated by using concentrated light to represent the light of the sun. When an artificial light is used for the purpose of better illustrating the phenomena daily occurring, the light should be placed where the clock stands, and a reflector be used attached to the rod C, so that, in revolving, the light may be constantly thrown toward the earth, as is the case in nature; or a ring, $w$, may be made to surround the sphere representing the sun, and connected to the gas-burner by an elastic tube, the said ring having an aperture for the gas-flame. A weighted rod in continuation of the rod C is held in a sleeve, $m$, near the crank-wheel, and serves to counterbalance the globes representing the earth and the moon, and the machinery thereto attached. The weight D, being adjustable, is held in place by a set-screw, so that the motion is either retarded or accelerated, according to its distance from the center. The main shaft $t$ of the clock may be prolonged, so as to extend to the outside of the sphere representing the sun, Fig. 1, and hands $u$ $u'$ may be attached to it to show the time upon an ordinary dial, $k$, placed upon the globe under the hands. In the standard or supporter, at a convenient distance from the globe representing the sun, is a joint, $q$, and the rod A is provided with a graded segment of a circle, $v$, and a set-screw to incline the instrument from zero to about seventy-five degrees, and hold it in any intermediate position, to represent at any degree of latitude the plane of the ecliptic as it appears.

Having thus described my invention, I claim—

1. In a tellurian, the combination of the sun S, earth E, and connecting-rod C, carrying the earth globe, placed eccentrically to the sun's center, so that the earth in its revolutions around the sun will show its perihelion and aphelion, as described.

2. The combination of the shaft 1, wheel $a$, pinion $o$, connecting-rod and sleeve C, the wheel being made removable, so that the revolutions of the earth and moon around their own axis may be shown independently of the sun, substantially as shown.

3. The combination of the earth E, its connecting-sleeve C, and rod $y$, for attaching it to the sun, and a counter-balance, substantially as described.

4. In combination with the moon M, the independent ring H, provided with a suitable handle, for illustrating at the will of the operator the phases of the moon, substantially as shown.

5. The combination of the universal joint $p$ and the bell-caps G, one of the caps being adjustable, so as to show different inclinations of the earth, substantially as specified.

6. In combination with the sun S, the joint $q$ in the rod A, for giving the plane of the ecliptic different inclinations, substantially as described and shown.

7. In combination with the sun S, a curved or semicircular gas-pipe provided with a burner, the pipe being rigidly secured to the counter-balance-rod, and arranged so as to revolve around the sun and always keep the burner in the same relative position to the earth E, substantially as specified.

8. In a tellurian, the sun S, having a clock-work within it and a dial upon its face, for representing the hour of the day, substantially as shown and described.

In testimony that I claim the foregoing, I have hereunto set my hand.

JOSEPH TROLL.

Witnesses:
  T. F. LEHMANN,
  WM. B. UPPERMAN.